US011871204B2

(12) United States Patent
Lee et al.

(10) Patent No.: US 11,871,204 B2
(45) **Date of Patent: *Jan. 9, 2024**

(54) APPARATUS AND METHOD FOR PROCESSING MULTI-CHANNEL AUDIO SIGNAL

(71) Applicant: Electronics and Telecommunications Research Institute, Daejeon (KR)

(72) Inventors: Yong Ju Lee, Daejeon (KR); Jeong Il Seo, Daejeon (KR); Seung Kwon Beack, Daejeon (KR); Kyeong Ok Kang, Daejeon (KR); Jin Woong Kim, Daejeon (KR); Jae Hyoun Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,696

(22) Filed: Jul. 29, 2022

(65) Prior Publication Data

US 2022/0369058 A1 Nov. 17, 2022

Related U.S. Application Data

(63) Continuation of application No. 16/703,226, filed on Dec. 4, 2019, now Pat. No. 11,405,738, which is a (Continued)

(30) Foreign Application Priority Data

Apr. 19, 2013 (KR) ........................ 10-2013-0043383
Apr. 18, 2014 (KR) ........................ 10-2014-0046741

(51) Int. Cl.
*H04S 3/00* (2006.01)
*G10L 19/008* (2013.01)

(52) U.S. Cl.
CPC ............ *H04S 3/008* (2013.01); *G10L 19/008* (2013.01); *H04S 2400/01* (2013.01)

(58) Field of Classification Search
CPC ..... H04S 3/008; H04S 2400/01; G10L 19/008
See application file for complete search history.

(56) References Cited

U.S. PATENT DOCUMENTS 5,371,799 A 12/1994 Lowe et al.
5,436,975 A 7/1995 Lowe et al.
(Continued)

FOREIGN PATENT DOCUMENTS

CN 1630434 A 6/2005
CN 101366081 A 2/2009
(Continued)

OTHER PUBLICATIONS

Jot et al., Beyond Surround sound—Creation, Coding and Reproduction of 3-D Audio Soundtracks, Audio Engineering Society, 2011, whole document (Year: 2011).
(Continued)

*Primary Examiner* — Sonia L Gay
(74) *Attorney, Agent, or Firm* — William Park & Associates Ltd.

(57) ABSTRACT

Disclosed is an apparatus and method for processing a multichannel audio signal. A multichannel audio signal processing method may include: generating an N-channel audio signal of N channels by down-mixing an M-channel audio signal of M channels; and generating a stereo audio signal by performing binaural rendering of the N-channel audio signal.

18 Claims, 6 Drawing Sheets

Related U.S. Application Data continuation of application No. 16/126,466, filed on Sep. 10, 2018, now Pat. No. 10,701,503, which is a continuation of application No. 14/767,538, filed as application No. PCT/KR2014/003424 on Apr. 18, 2014, now Pat. No. 10,075,795.

(56) References Cited

U.S. PATENT DOCUMENTS

| | | | |
|---|---|---|---|
| 5,596,644 | A | 1/1997 | Abel et al. |
| 5,742,689 | A | 4/1998 | Tucker et al. |
| 5,987,142 | A | 11/1999 | Courneau et al. |
| 6,180,866 | B1 | 1/2001 | Kitamura |
| 6,188,769 | B1 | 2/2001 | Jot et al. |
| 6,628,787 | B1 | 9/2003 | McGrath et al. |
| 6,639,989 | B1 | 10/2003 | Zacharov et al. |
| 6,925,426 | B1 | 8/2005 | Hartmann |
| 6,928,179 | B1 | 8/2005 | Yamada et al. |
| 6,970,569 | B1 | 11/2005 | Yamada |
| 7,099,482 | B1 | 8/2006 | Jot et al. |
| 7,146,296 | B1 | 12/2006 | Carlbom et al. |
| 7,215,782 | B2 | 5/2007 | Chen |
| 7,536,021 | B2 | 5/2009 | Dickins et al. |
| 7,903,824 | B2 | 3/2011 | Faller et al. |
| 7,936,887 | B2 | 5/2011 | Smyth |
| 8,081,762 | B2 | 12/2011 | Ojala et al. |
| 8,265,284 | B2 | 9/2012 | Villemoes et al. |
| 8,270,616 | B2 | 9/2012 | Slamka et al. |
| 8,325,929 | B2 | 12/2012 | Koppens et al. |
| 9,215,544 | B2 | 12/2015 | Faure et al. |
| 9,226,089 | B2 | 12/2015 | Mundt et al. |
| 9,319,819 | B2 | 4/2016 | Lee et al. |
| 9,344,826 | B2 | 5/2016 | Ramo et al. |
| 9,462,387 | B2 | 10/2016 | Oomen et al. |
| 9,842,597 | B2 | 12/2017 | Lee et al. |
| 9,918,179 | B2 | 3/2018 | Kuhr et al. |
| 9,986,365 | B2 | 5/2018 | Lee et al. |
| 10,199,045 | B2 | 2/2019 | Lee et al. |
| 10,614,820 | B2 | 4/2020 | Lee et al. |
| 10,950,248 | B2 | 3/2021 | Lee et al. |
| 2002/0122559 | A1 | 9/2002 | Fay et al. |
| 2003/0236814 | A1 | 12/2003 | Miyasaka et al. |
| 2005/0018039 | A1 | 1/2005 | Lucioni |
| 2005/0053249 | A1 | 3/2005 | Wu et al. |
| 2005/0063551 | A1 | 3/2005 | Cheng et al. |
| 2005/0276430 | A1 | 12/2005 | He et al. |
| 2006/0045294 | A1 | 3/2006 | Smyth |
| 2006/0086237 | A1 | 4/2006 | Burwen |
| 2007/0019813 | A1 | 1/2007 | Hilpert et al. |
| 2007/0133831 | A1 | 6/2007 | Kim et al. |
| 2007/0140498 | A1 | 6/2007 | Moon et al. |
| 2007/0160219 | A1 | 7/2007 | Jakka et al. |
| 2007/0172086 | A1 | 7/2007 | Dickins et al. |
| 2007/0213990 | A1 | 9/2007 | Moon et al. |
| 2007/0223708 | A1 | 9/2007 | Villemoes et al. |
| 2007/0223749 | A1 | 9/2007 | Kim et al. |
| 2007/0244706 | A1 | 10/2007 | Tsushima |
| 2007/0280485 | A1 | 12/2007 | Willemoes |
| 2007/0297616 | A1 | 12/2007 | Plogsties et al. |
| 2008/0008327 | A1 | 1/2008 | Ojala et al. |
| 2008/0008342 | A1 | 1/2008 | Sauk |
| 2008/0031462 | A1 | 2/2008 | Walsh et al. |
| 2008/0033729 | A1 | 2/2008 | Ko et al. |
| 2008/0037795 | A1 | 2/2008 | Ko et al. |
| 2008/0049943 | A1 | 2/2008 | Faller et al. |
| 2008/0097750 | A1 | 4/2008 | Seefeldt et al. |
| 2008/0175396 | A1 | 7/2008 | Ko et al. |
| 2008/0192941 | A1 | 8/2008 | Oh et al. |
| 2008/0205658 | A1 | 8/2008 | Breebaart |
| 2008/0240448 | A1 | 10/2008 | Gustafsson et al. |
| 2008/0273708 | A1 | 11/2008 | Sandgren et al. |
| 2008/0306720 | A1 | 12/2008 | Nicol et al. |
| 2009/0012796 | A1 | 1/2009 | Jung et al. |
| 2009/0043591 | A1 | 2/2009 | Breebaart et al. |
| 2009/0046864 | A1 | 2/2009 | Mahabub et al. |
| 2009/0103738 | A1 | 4/2009 | Faure et al. |
| 2009/0129601 | A1 | 5/2009 | Ojala et al. |
| 2009/0144063 | A1 | 6/2009 | Beack et al. |
| 2009/0281804 | A1 | 11/2009 | Watanabe et al. |
| 2010/0017002 | A1 | 1/2010 | Oh et al. |
| 2010/0017195 | A1 | 1/2010 | Villemoes |
| 2010/0046762 | A1 | 2/2010 | Henn et al. |
| 2010/0094631 | A1 | 4/2010 | Engdegard et al. |
| 2010/0119075 | A1 | 5/2010 | Xiang et al. |
| 2010/0191537 | A1 | 7/2010 | Breebaart |
| 2010/0223061 | A1 | 9/2010 | Ojanpera |
| 2010/0246832 | A1 | 9/2010 | Villemoes et al. |
| 2011/0044457 | A1 | 2/2011 | Seo et al. |
| 2011/0081023 | A1 | 4/2011 | Raghuvanshi et al. |
| 2011/0135098 | A1 | 6/2011 | Kuhr et al. |
| 2011/0158416 | A1 | 6/2011 | Yuzuriha |
| 2011/0170721 | A1 | 7/2011 | Dickins et al. |
| 2011/0211702 | A1 | 9/2011 | Mundt et al. |
| 2011/0261966 | A1 | 10/2011 | Engdegard |
| 2011/0264456 | A1 | 10/2011 | Koppens et al. |
| 2011/0317522 | A1 | 12/2011 | Florencio et al. |
| 2012/0010879 | A1 | 1/2012 | Tsujino et al. |
| 2012/0082319 | A1 | 4/2012 | Jot et al. |
| 2012/0093323 | A1 | 4/2012 | Lee et al. |
| 2012/0140938 | A1 | 6/2012 | Yoo |
| 2012/0201405 | A1 | 8/2012 | Slamka et al. |
| 2012/0213375 | A1 | 8/2012 | Mahabub et al. |
| 2012/0224702 | A1 | 9/2012 | Brinker et al. |
| 2012/0243713 | A1 | 9/2012 | Hess |
| 2012/0263311 | A1 | 10/2012 | Neugebauer et al. |
| 2012/0314876 | A1 | 12/2012 | Vilkamo et al. |
| 2012/0328107 | A1 | 12/2012 | Nyström et al. |
| 2013/0058492 | A1 | 3/2013 | Silzle et al. |
| 2013/0142341 | A1 | 6/2013 | Galdo et al. |
| 2013/0202125 | A1 | 8/2013 | Sena et al. |
| 2013/0216059 | A1 | 8/2013 | Yoo |
| 2013/0236040 | A1 | 9/2013 | Crawford et al. |
| 2013/0268280 | A1 | 10/2013 | Galdo et al. |
| 2013/0268281 | A1 | 10/2013 | Walther |
| 2013/0272527 | A1 | 10/2013 | Oomen et al. |
| 2014/0019146 | A1 | 1/2014 | Neuendorf et al. |
| 2014/0037094 | A1 | 2/2014 | Ma et al. |
| 2014/0072126 | A1 | 3/2014 | Uhle et al. |
| 2014/0153727 | A1 | 6/2014 | Walsh et al. |
| 2014/0169568 | A1 | 6/2014 | Li et al. |
| 2014/0270216 | A1 | 9/2014 | Tsilfidis et al. |
| 2014/0348354 | A1 | 11/2014 | Christoph et al. |
| 2014/0350944 | A1 | 11/2014 | Jot et al. |
| 2014/0355793 | A1 | 12/2014 | Dublin et al. |
| 2014/0355794 | A1 | 12/2014 | Morrell et al. |
| 2014/0355795 | A1 | 12/2014 | Xiang et al. |
| 2014/0355796 | A1 | 12/2014 | Xiang et al. |
| 2015/0030160 | A1 | 1/2015 | Lee et al. |
| 2015/0125010 | A1 | 5/2015 | Yang et al. |
| 2015/0199973 | A1 | 7/2015 | Borsum et al. |
| 2015/0213807 | A1 | 7/2015 | Breebaart et al. |
| 2015/0256956 | A1 | 9/2015 | Jensen et al. |
| 2015/0350801 | A1 | 12/2015 | Koppens et al. |
| 2015/0358754 | A1 | 12/2015 | Koppens et al. |
| 2016/0029144 | A1 | 1/2016 | Cartwright et al. |
| 2016/0088407 | A1 | 3/2016 | Imedyb et al. |
| 2016/0142854 | A1 | 5/2016 | Fueg et al. |
| 2016/0232902 | A1 | 8/2016 | Lee et al. |
| 2016/0275956 | A1 | 9/2016 | Lee et al. |
| 2018/0091927 | A1 | 3/2018 | Lee et al. |
| 2018/0102131 | A1 | 4/2018 | Lee et al. |
| 2021/0067898 | A1 | 3/2021 | Neukam et al. |
| 2021/0201923 | A1 | 7/2021 | Lee et al. |

FOREIGN PATENT DOCUMENTS

| | | | |
|---|---|---|---|
| CN | 101366321 | A | 2/2009 |
| CN | 101809654 | A | 8/2010 |
| JP | 2012227647 | A | 11/2012 |
| KR | 100754220 | B1 | 9/2007 |
| KR | 1020080078907 | A | 8/2008 |
| KR | 1020100063113 | A | 6/2010 |
| KR | 1020100106193 | A | 10/2010 |
| KR | 1020110039545 | A | 4/2011 |

(56) References Cited

FOREIGN PATENT DOCUMENTS

| | | | |
|---|---|---|---|
| KR | 1020120038891 | A | 4/2012 |
| KR | 101175592 | B1 | 8/2012 |
| KR | 1020130004373 | A | 1/2013 |
| WO | 9914983 | A1 | 3/1999 |
| WO | 9949574 | A1 | 9/1999 |

OTHER PUBLICATIONS

Neuendorf et al., Unified Speech and Audio Coding Scheme for High Quality at Low Bitrates, IEEE, 2009, whole document (Year: 2009).

FIG. 5

| | | | | | | Output Formats | | | | Input Formats | | | |
|---|---|---|---|---|---|---|---|---|---|---|---|---|---|
| No. | LS Label | Az° | Az. Tol.° | El.° | El. Tol.° | O-5.1 | O-8.1 | O-10.1 | O-22.2 | I-8.1 | I-9.1 | I-11.1 | I-22.2 |
| 1 | M+000 | 0 | ±2 | 0 | ±2 | X | | X | X | | X | X | X |
| 2 | M+030 | 30 | ±2 | 0 | ±2 | X | X | X | X | X | X | X | X |
| 3 | M-030 | -30 | ±2 | 0 | ±2 | X | X | X | X | X | X | X | X |
| 4 | M+060 | 60 | ±2 | 0 | ±2 | | | | X | | | | X |
| 5 | M-060 | -60 | ±2 | 0 | ±2 | | | | X | | | | X |
| 6 | M+090 | 90 | ±5 | 0 | ±2 | | | | X | | | | X |
| 7 | M-090 | -90 | ±5 | 0 | ±2 | | | | X | | | | X |
| 8 | M+110 | 110 | ±5 | 0 | ±2 | X | X | X | | X | X | X | |
| 9 | M-110 | -110 | ±5 | 0 | ±2 | X | X | X | | X | X | X | |
| 10 | M+135 | 135 | ±5 | 0 | ±2 | | | | X | | | | X |
| 11 | M-135 | -135 | ±5 | 0 | ±2 | | | | X | | | | X |
| 12 | M+180 | 180 | ±5 | 0 | ±2 | | | | X | | | | X |
| 13 | U+000 | 0 | ±2 | 35 | ±10 | | X | | X | | | X | X |
| 14 | U+045 | 45 | ±5 | 35 | ±10 | | | | X | | | | X |
| 15 | U-045 | -45 | ±5 | 35 | ±10 | | | | X | | | | X |
| 16 | U+030 | 30 | ±5 | 35 | ±10 | | X | X | | X | X | X | |
| 17 | U-030 | -30 | ±5 | 35 | ±10 | | X | X | | X | X | X | |
| 18 | U+090 | 90 | ±5 | 35 | ±10 | | | | X | | | | X |
| 19 | U-090 | -90 | ±5 | 35 | ±10 | | | | X | | | | X |
| 20 | U+110 | 110 | ±5 | 35 | ±10 | | | X | | X | X | X | |
| 21 | U-110 | -110 | ±5 | 35 | ±10 | | | X | | X | X | X | |
| 22 | U+135 | 135 | ±5 | 35 | ±10 | | | | X | | | | X |
| 23 | U-135 | -135 | ±5 | 35 | ±10 | | | | X | | | | X |
| 24 | U+180 | 180 | ±5 | 35 | ±10 | | | | X | | | | X |
| 25 | T+000 | 0 | ±2 | 90 | ±10 | | | X | X | | | X | X |
| 26 | L+000 | 0 | ±2 | -15 | +5-25 | | X | | X | | | | X |
| 27 | L+045 | 45 | ±5 | -15 | +5-25 | | | | X | | | | X |
| 28 | L-045 | -45 | ±5 | -15 | +5-25 | | | | X | | | | X |
| 29 | LTE1 | 45 | ±15 | -15 | ±15 | X | X | X | X | X | X | X | X |
| 30 | LTE2 | -45 | ±15 | -15 | ±15 | | | | X | | | | X |

APPARATUS AND METHOD FOR PROCESSING MULTI-CHANNEL AUDIO SIGNAL

CROSS-REFERENCE TO RELATED APPLICATIONS

The present application is a continuation application of U.S. patent application Ser. No. 16/703,226, filed on Dec. 4, 2019, which is a continuation application of U.S. patent application Ser. No. 16/126,466, filed on Sep. 10, 2018, which is a continuation application of U.S. patent application Ser. No. 14/767,538, filed on Aug. 12, 2015, which was the National Stage of International Application No. PCT/KR2014/003424 filed on Apr. 18, 2014, which claims priority to Korean Patent Applications: KR10-2013-0043383, filed on Apr. 19, 2013, and KR10-2014-0046741, filed on Apr. 18, 2014, with the Korean Intellectual Property Office, which are incorporated herein by reference in their entirety.

TECHNICAL FIELD

Embodiments of the present invention relate to a multichannel audio signal processing apparatus included in a three-dimensional (3D) audio decoder and a multichannel audio signal processing method.

BACKGROUND ART

With the enhancement in the quality of multimedia contents, a high quality multichannel audio signal, such as a 7.1 channel audio signal, a 10.2 channel audio signal, a 13.2 channel audio signal, and a 22.2 channel audio signal, having a relatively large number of channels compared to an existing 5.1 channel audio signal, has been used. However, in many cases, the high quality multichannel audio signal may be listened to with a 2-channel stereo loudspeaker or a headphone through a personal terminal such as a smartphone or a personal computer (PC).

Accordingly, binaural rendering technology for downmixing a multichannel audio signal to a stereo audio signal has been developed to make it possible to listen to the high quality multichannel audio signal with a 2-channel stereo loudspeaker or a headphone.

The existing binaural rendering may generate a binaural stereo audio signal by filtering each channel of a 5.1 channel audio signal or a 7.1 channel audio signal through a binaural filter such as a head related transfer function (HRTF) or a binaural room impulse response (BRIR). In the existing method, an amount of filtering calculation may increase according to an increase in the number of channels of an input multichannel audio signal.

Accordingly, in a case in which an amount of calculation increases according to an increase in the number of channels of a multichannel audio signal, such as a 10.2 channel audio signal and a 22.2 channel audio signal, it may be difficult to perform a real-time calculation for playback using a 2-channel stereo loudspeaker or a headphone. In particular, a mobile terminal having a relatively low calculation capability may not readily perform a binaural filtering calculation in real time according to an increase in the number of channels of a multichannel audio signal.

Accordingly, there is a need for a method that may decrease an amount of calculation required for binaural filtering to make it possible to perform a real-time calculation when rendering a high quality multichannel audio signal having a relatively large number of channels to a binaural signal.

DISCLOSURE OF INVENTION

Technical Goals

An aspect of the present invention provides an apparatus and method that may down-mix an input multichannel audio signal and then perform binaural rendering, thereby decreasing an amount of calculation required for binaural rendering although the number of channels of the multichannel audio signal increases.

Technical Solutions

According to an aspect of the present invention, there is provided a multichannel audio signal processing method including: generating an N-channel audio signal of N channels by down-mixing an M-channel audio signal of M channels; and generating a stereo audio signal by performing binaural rendering of the N-channel audio signal.

The generating of the stereo audio signal may include: generating channel-by-channel stereo audio signals using filters corresponding to playback locations of channel-by-channel audio signals of the N channels; and generating the stereo audio signal by mixing the channel-by-channel stereo audio signals.

The generating of the stereo audio signal may include generating the stereo audio signal using a plurality of binaural renderers respectively corresponding to the channels of the N-channel audio signal.

According to another aspect of the present invention, there is provided a multichannel audio signal processing method including: sub-sampling the number of channels of the multichannel audio signal based on a virtual loudspeaker layout; and generating a stereo audio signal by performing binaural rendering of the sub-sampled multichannel audio signal.

The generating of the stereo audio signal may include performing binaural rendering of the sub-sampled multichannel audio signal in a frequency domain.

The generating of the stereo audio signal may include generating the stereo audio signal using a plurality of binaural renderers respectively corresponding to the channels of the N-channel audio signal.

According to still another aspect of the present invention, there is provided a multichannel audio signal processing method including: sub-sampling the number of channels of the multichannel audio signal based on a three-dimensional (3D) loudspeaker layout; and generating a stereo audio signal by performing binaural rendering of the sub-sampled multichannel audio signal.

The generating of the stereo audio signal may include performing binaural rendering of the sub-sampled multichannel audio signal in a frequency domain.

The generating of the stereo audio signal may include generating the stereo audio signal using a plurality of binaural renderers respectively corresponding to the channels of the N-channel audio signal.

According to still another aspect of the present invention, there is provided a multichannel audio signal processing apparatus including: a channel down-mixing unit configured to generate an N-channel audio signal of N channels by down-mixing an M-channel audio signal of M channels; and a binaural rendering unit configured to generate a stereo audio signal by performing binaural rendering of the N-channel audio signal.

The binaural rendering unit may generate channel-by-channel stereo audio signals using filters corresponding to playback locations of channel-by-channel audio signals of the N channels, and may generate the stereo audio signal by mixing the channel-by-channel stereo audio signals.

The binaural rendering unit may generate the stereo audio signal using a plurality of binaural renderers respectively corresponding to the channels of the N-channel audio signal.

According to still another aspect of the present invention, there is provided a multichannel audio signal processing apparatus including: a channel down-mixing unit configured to sub-sample the number of channels of a multichannel audio signal based on a virtual loudspeaker layout; and a binaural rendering unit configured to generate a stereo audio signal by performing binaural rendering of the sub-sampled multichannel audio signal.

The binaural rendering unit may perform binaural rendering of the sub-sampled multichannel audio signal in a frequency domain.

The binaural rendering unit may generate the stereo audio signal using a plurality of binaural renderers respectively corresponding to the channels of the N-channel audio signal.

According to still another aspect of the present invention, there is provided a multichannel audio signal processing apparatus including: a channel down-mixing unit configured to sub-sample the number of channels of the multichannel audio signal based on a 3D loudspeaker layout; and a binaural rendering unit configured to generate a stereo audio signal by performing binaural rendering of the sub-sampled multichannel audio signal.

The binaural rendering unit may perform binaural rendering of the sub-sampled multichannel audio signal in a frequency domain.

The binaural rendering unit may generate the stereo audio signal using a plurality of binaural renderers respectively corresponding to the channels of the N-channel audio signal.

Effects of the Invention

According to embodiments of the present invention, it is possible to down-mix an input multichannel audio signal and then perform binaural rendering, thereby decreasing an amount of calculation required for binaural rendering although the number of channels of the multichannel audio signal increases.

BRIEF DESCRIPTION OF DRAWINGS

FIG. 5 is a table showing an example of location information of a loudspeaker used by a multichannel audio signal processing apparatus according to an embodiment of the present invention.

BEST MODE FOR CARRYING OUT THE INVENTION

Figure 1:
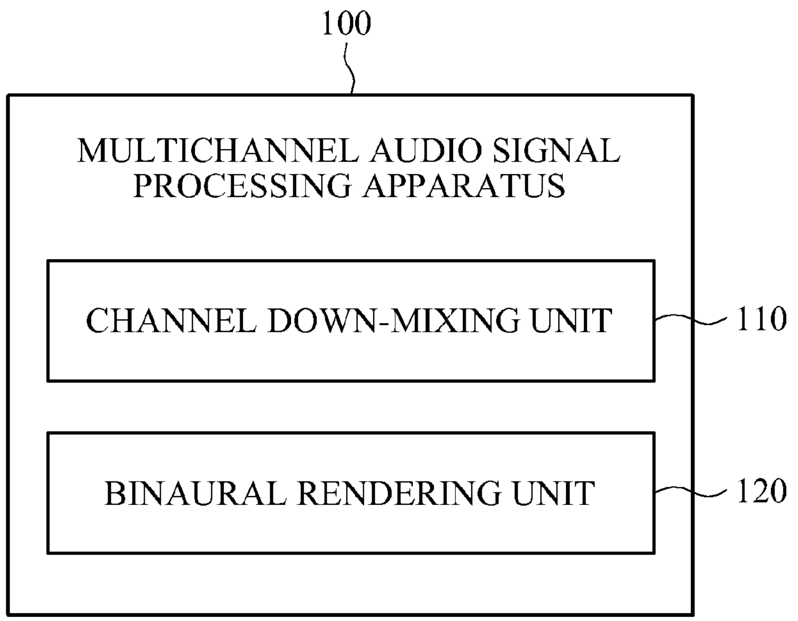
FIG. 1 is a block diagram illustrating a multichannel audio signal processing apparatus according to an embodiment of the present invention.

Reference will now be made in detail to embodiments of the present invention, examples of which are illustrated in the accompanying drawings, wherein like reference numerals refer to like elements throughout. The embodiments are described below in order to explain the present invention by referring to the figures. A multichannel audio signal processing method according to an embodiment of the present invention may be performed by a multichannel audio signal processing apparatus according to an embodiment of the present invention.

FIG. 1 is a block diagram illustrating a multichannel audio signal processing apparatus according to an embodiment of the present invention.

Referring to FIG. 1, a multichannel audio signal processing apparatus 100 may include a channel down-mixing unit 110 and a binaural rendering unit 120.

The channel down-mixing unit 110 may generate an N-channel audio signal of N channels by down-mixing an M-channel audio signal of M channels. Here, the M channels denote the number of channels greater than the N channels (N<M).

For example, when an M-channel audio signal includes three-dimensional (3D) spatial information, the channel down-mixing unit 110 may down-mix the M-channel audio signal to minimize loss of the 3D spatial information included in the M-channel audio signal. Here, the 3D spatial information may include a height channel.

For example, in the case of down-mixing the M-channel audio signal having a 3D channel layout to an N-channel audio signal having a two-dimensional (2D) channel layout, it may be difficult to reproduce 3D spatial information of the M-channel audio signal using the N-channel audio signal.

Accordingly, when the M-channel audio signal includes the 3D spatial information, the channel down-mixing unit 110 may down-mix the M-channel audio signal so that even the N-channel audio signal generated through down-mixing may include the 3D spatial information. In detail, when the M-channel audio signal includes the 3D spatial information, the channel down-mixing unit 110 may down-mix the M-channel audio signal based on a channel layout including the 3D spatial information.

For example, when an input multichannel audio signal has a 22.2 channel layout among 3D channel layouts, the channel down-mixing unit 110 may generate a 10.2 channel or 8.1 channel audio signal that provides a sound field similar to a 22.2 channel audio signal through down-mixing and also has the minimum number of channels.

The binaural rendering unit 120 may generate a stereo audio signal by performing binaural rendering of the N-channel audio signal generated by the channel down-mixing unit 110. For example, the binaural rendering unit 120 may generate channel-by-channel stereo audio signals using a plurality of binaural rendering filters corresponding to playback locations of channel-by-channel audio signals of the N channels of the N-channel audio signal, and may generate a single stereo audio signal by mixing the channel-by-channel stereo audio signals.

Figure 2:
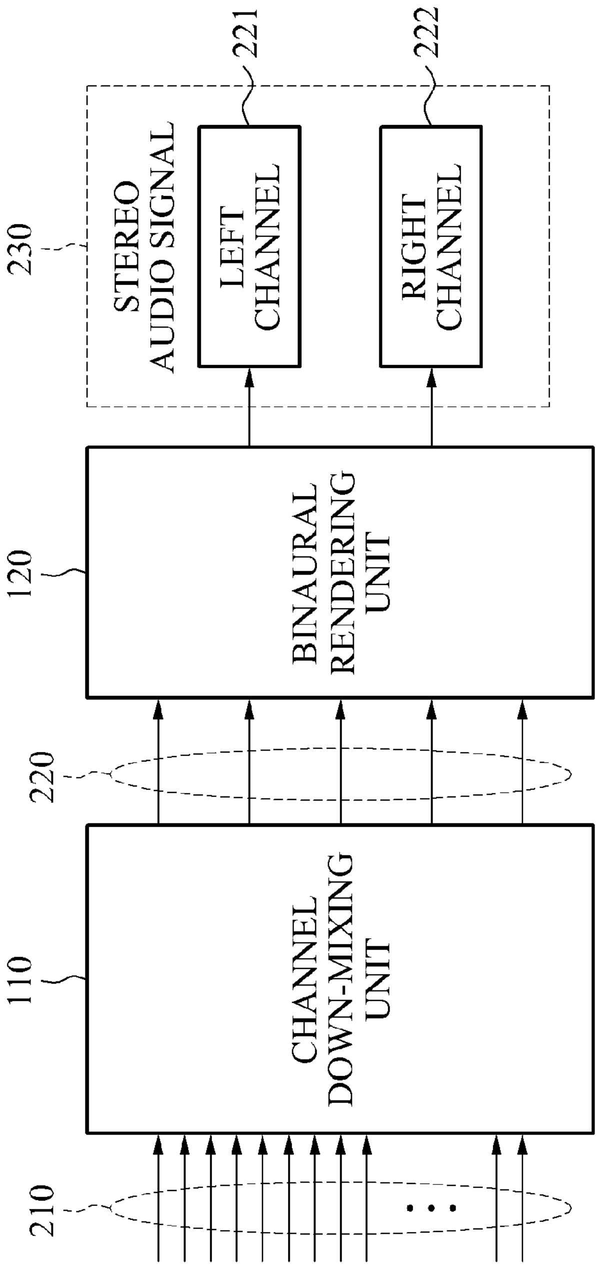
FIG. 2 is a diagram illustrating a multichannel audio signal processing apparatus according to an embodiment of the present invention.

FIG. 2 is a diagram illustrating a multichannel audio signal processing apparatus according to an embodiment of the present invention.

The channel down-mixing unit 110 may receive an M-channel audio signal 210 of M channels corresponding to a multichannel audio signal. The channel down-mixing unit 110 may output an N-channel audio signal 220 of N channels by down-mixing the M-channel audio signal 210. Here, the number of channels of the N-channel audio signal 220 may be less than the number of channels of the M-channel audio signal 210.

When the M-channel audio signal 210 includes 3D spatial information, the channel down-mixing unit 110 may down-mix the M-channel audio signal 210 to the N-channel audio signal 220 having a 3D layout to minimize loss of the 3D spatial information included in the M-channel audio signal.

The binaural rendering unit 120 may output a stereo audio signal 230 including a left channel 221 and a right channel 222 by performing binaural rendering of the N-channel audio signal 220.

Accordingly, the multichannel audio signal processing apparatus 100 may down-mix the input M-channel audio signal 210 in advance prior to performing binaural rendering of the N-channel audio signal 220, without directly performing binaural rendering of the M-channel audio signal 210. Through this operation, the number of channels to be processed in binaural rendering decreases and thus, an amount of filtering calculation required for binaural rendering may decrease in practice.

Figure 3:
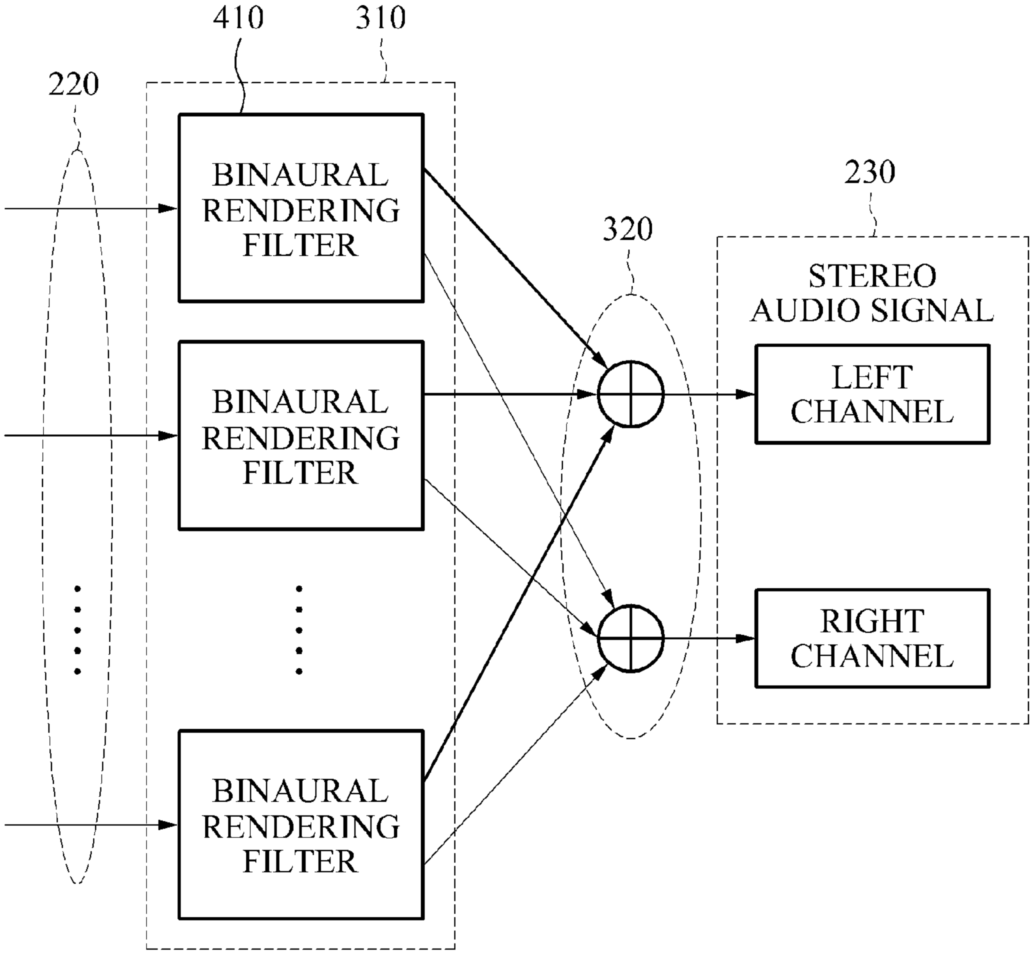
FIG. 3 is a diagram illustrating an operation of a binaural rendering unit according to an embodiment of the present invention.

FIG. 3 is a diagram illustrating an operation of a binaural rendering unit according to an embodiment of the present invention.

The N-channel audio signal 220 down-mixed from the M-channel audio signal 210 may indicate N 1-channel mono audio signals. A binaural rendering unit 310 may perform binaural rendering of the N-channel audio signal 220 using N binaural rendering filters 410 corresponding to N mono audio signals, respectively, base on 1:1.

Here, the binaural rendering filter 410 may generate a left channel audio signal and a right channel audio signal by performing binaural rendering of an input mono audio signal. Accordingly, when binaural rendering is performed by the binaural rendering unit 310, N left channel audio signals and N right channel audio signals may be generated.

The binaural rendering unit 310 may output the stereo audio signal 230 including a single left channel audio signal and a single right channel audio signal by mixing the N left channel audio signals and the N right channel audio signals. In detail, the binaural rendering unit 310 may output the stereo audio signal 230 by mixing channel-by-channel stereo audio signals generated by the plurality of binaural rendering filters 410.

Figure 4:
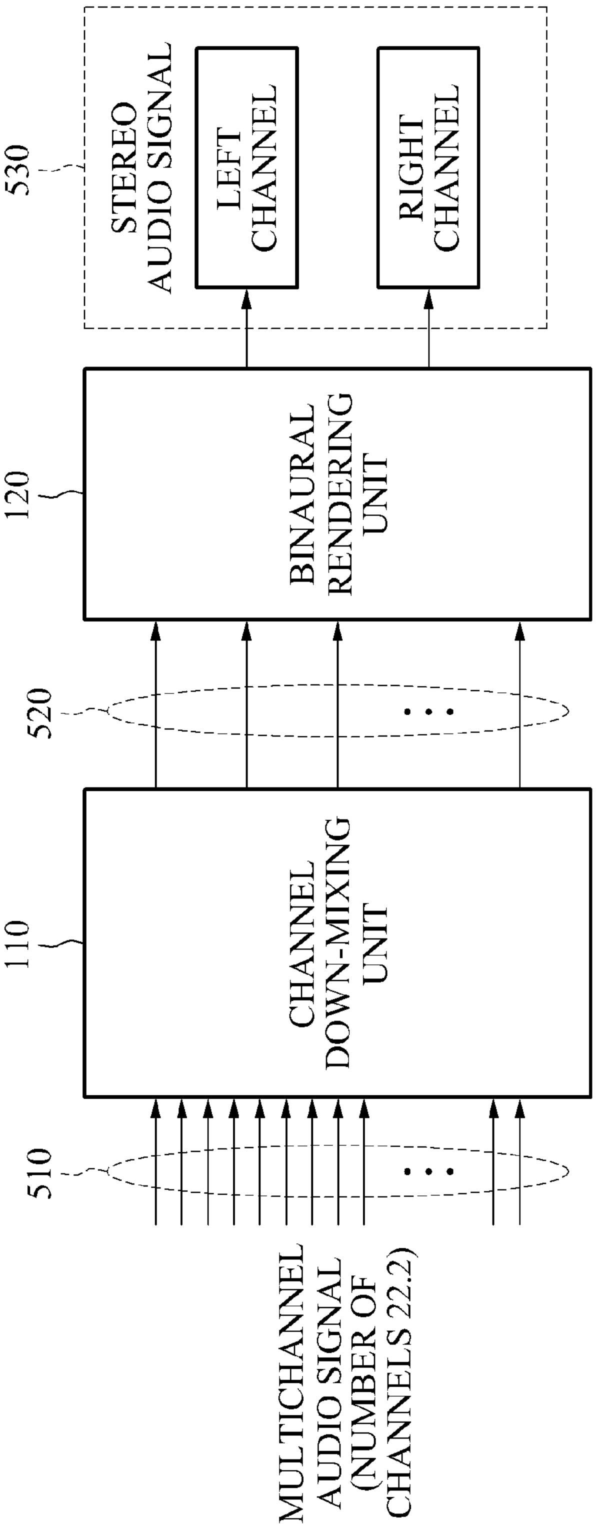
FIG. 4 is a diagram illustrating an operation of a multi-channel audio signal processing apparatus according to an embodiment of the present invention.

FIG. 4 is a diagram illustrating an operation of a multichannel audio signal processing apparatus according to an embodiment of the present invention.

FIG. 4 illustrates a processing process when an M-channel audio signal corresponds to a 22.2 channel audio signal.

The channel down-mixing unit 110 may receive and then down-mix a 22.2 channel audio signal 510. The channel down-mixing unit 110 may output a 10.2 channel or 8.1 channel audio signal 520 from the 22.2 channel audio signal 510. Since the 22.2 channel audio signal 510 includes 3D spatial information, the channel down-mixing unit 110 may output the 10.2 channel or 8.1 channel audio signal 520 that maintains a sound field similar to the 22.2 channel audio signal 510 and has the minimum number of channels.

The binaural rendering unit 120 may output a stereo audio signal 530 including a left channel audio signal and a right channel audio signal by performing binaural rendering on each of a plurality of mono audio signals constituting the down-mixed 10.2 channel or 8.1 channel audio signal 520.

The multichannel audio signal processing apparatus 100 may down-mix the input 22.2 channel audio signal 510 to the 10.2 channel or 8.1 channel audio signal 520 having the number of channels less than the 22.2 channel audio signal 510 and may input the N-channel audio signal 220 to the binaural rendering unit 120, thereby decreasing an amount of calculation required for binaural rendering compared to the existing method and performing binaural rendering of a multichannel audio signal having a relatively large number of channels.

FIG. 5 is a table showing an example of location information of a loudspeaker used by a multichannel audio signal processing apparatus according to an embodiment of the present invention.

5.1 channel, 8.1 channel, 10.1 channel, and 22.2 channel audio signals may have input formats and output formats of FIG. 5.

Referring to FIG. 5, loudspeaker (LS) labels of 8.1 channel, 10.1 channel, and 22.2 channel audio signals may start with "U", "T", and "L". "U" may indicate an upper layer corresponding to a loudspeaker positioned at a location higher than a user, "T" may indicate a top layer corresponding to a loudspeaker positioned on a head of the user, and "L" may indicate a lower layer corresponding to a loudspeaker positioned at a location lower than the user.

Here, audio signals played back using the loudspeakers positioned on the upper layer, the top layer, and the lower layer may further include 3D spatial information compared to an audio signal played back using a loudspeaker positioned on a middle layer. For example, the 5.1 channel audio signal played back using only the loudspeaker positioned on the middle layer may not include 3D spatial information. The 22.2 channel, 8.1 channel, and 10.1 channel audio signals using the loudspeakers positioned on the upper layer, the top layer, and the lower layer may include 3D spatial information.

In this case, when an input multichannel audio signal is the 22.2 channel audio signal, the 22.2 channel audio signal may need to be down-mixed to the 10.1 channel or 8.1 channel audio signal including the 3D spatial information in order to maintain a sound field corresponding to a 3D effect of the 22.2 channel audio signal.

Figure 6:
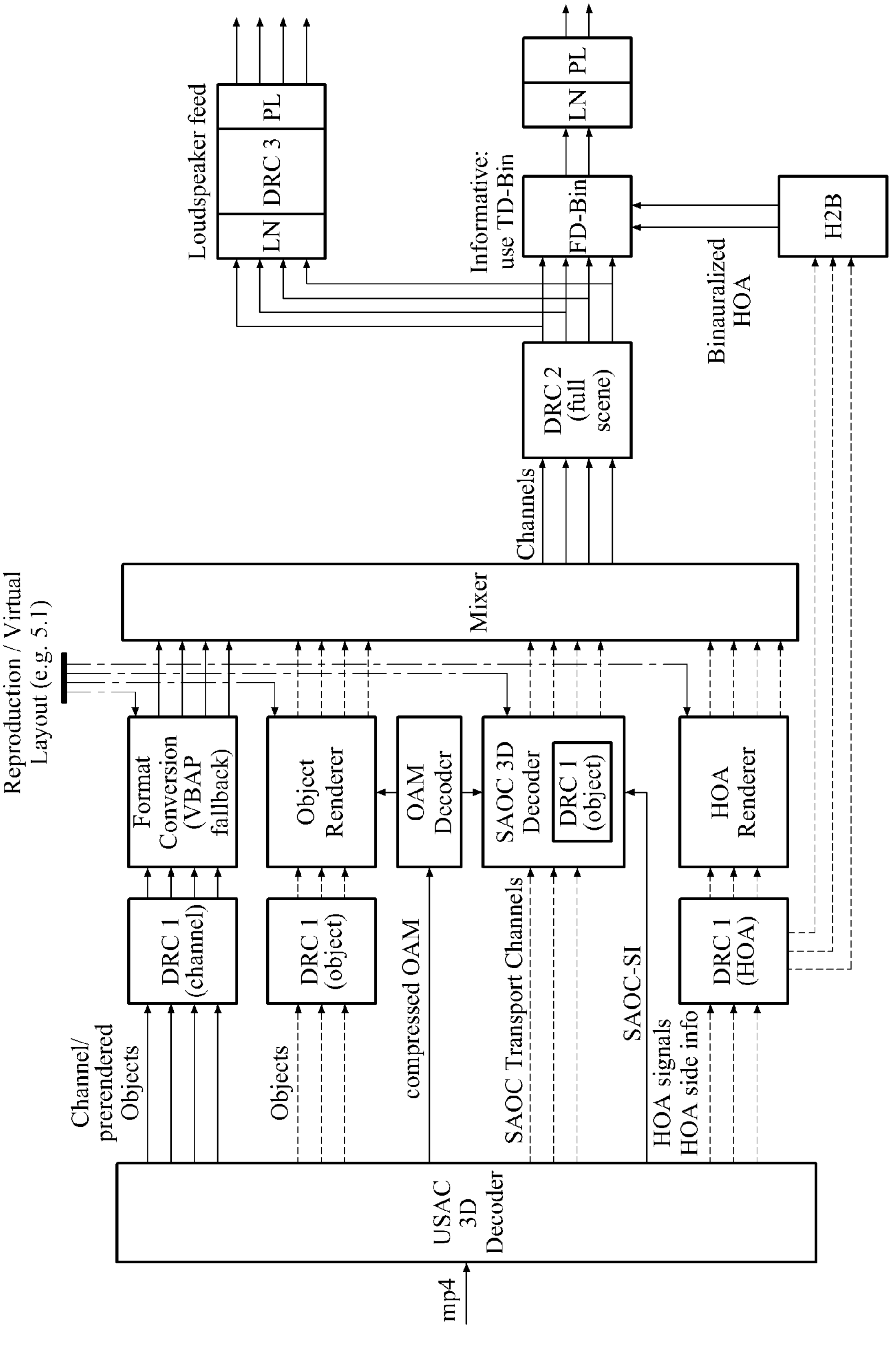
FIG. 6 is a diagram illustrating a three-dimensional (3D) audio decoder including a multichannel audio signal processing apparatus according to an embodiment of the present invention.

FIG. 6 is a diagram illustrating a 3D audio decoder including a multichannel audio signal processing apparatus according to an embodiment of the present invention.

Referring to FIG. 6, the 3D audio decoder is illustrated. A bitstream generated by the 3D audio decoder is input to a unified speech audio coding (USAC) 3D decoder in a form of MP4. The USAC 3D decoder may extract a plurality of channel/prerendered objects, a plurality of objects, compressed object metadata (OAM), spatial audio object coding (SAOC) transport channels, SAOC side information (SI), and high-order ambisonics (HOA) signals by decoding the bitstream.

The plurality of channel/prerendered objects, the plurality of objects, and the HOA signals may be input through a dynamic range control (DRC1) and may be input to a format conversion unit, an object renderer, and a HOA renderer, respectively.

Outputs results of the format conversion unit, the object renderer, the HOA render, and a SAOC 3D decoder may be input to a mixer. An audio signal corresponding to a plurality of channels may be output from the mixer.

The audio signal corresponding to the plurality of channels, output from the mixer, may pass through a DRC 2 and then may be input to a DRC 3 or frequency domain (FD)-bin based on a playback terminal. Here, FD-Bin indicates a binaural renderer of a frequency domain.

Most renderers described in FIG. 6 may provide a quadrature mirror filter (QMF) domain interface. The DRC 2 and the DRC 3 may use a QMF expression for a multiband DRC.

The format conversion unit of FIG. 6 may correspond to a multichannel audio signal processing apparatus according to an embodiment of the present invention. The format conversion unit may output a channel audio signal in a variety of forms. Here, a playback environment may indicate an actual playback environment, such as a loudspeaker and a headphone, or a virtual layout arbitrarily settable through an interface.

Here, when the format conversion unit performs a binaural rendering function, the format conversion unit may down-mix an audio signal corresponding to a plurality of channels and then perform binaural rendering on the down-mixed result, thereby decreasing the complexity of binaural rendering. That is, the format conversion unit may sub-sample the number of channels of a multichannel audio signal in a virtual layout, instead of using the entire set of a binaural room impulse response (BRIR) such as a given 22.2 channel, thereby decreasing the complexity of binaural rendering.

According to embodiments of the present invention, it is possible to decrease an amount of calculation required for binaural rendering by initially down-mixing an M-channel audio signal corresponding to a multichannel audio signal to an N-channel audio signal having the number of channels less than the M-channel audio signal, and by performing binaural rendering of the N-channel audio signal. In addition, it is possible to effectively perform binaural rendering of the multichannel audio signal having a relatively large number of channels.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A multichannel audio signal processing method processed by a decoder, comprising:

generating an N-channel audio signal of N channels by down-mixing an M-channel audio signal of M channels in a format converter using playback environment or virtual layout, the number of M channels being greater than the number of N channels;

generating a stereo audio signal by performing binaural rendering of the N-channel audio signal in a binaural renderer; and outputting the stereo audio signal, wherein a plurality of objects are inputted to an object renderer through a first dynamic range control (DRC1).

2. The method of claim 1, wherein the decoder extracts a plurality of channel/prerendered objects and a plurality of objects from a bitstream.

3. The method of claim 1, wherein a plurality of channels corresponding to the M channel audio signal of M channels are inputted to the format converter through a first dynamic range control (DRC1).

4. The method of claim 1, wherein the N-channel audio signal of N channels are outputted from a mixer.

5. The method of claim 1, wherein the N-channel audio signal of N channels is inputted into a binaural renderer connected with a second dynamic range control (DRC2) or is inputted into a third dynamic range control (DRC3) connected with the second dynamic range control (DRC2) for a loudspeaker feed.

6. The method of claim 1, wherein the generating of the stereo audio signal comprises:

applying a N binaural filter for binaural rendering into each channel audio signal of N-channel audio signal, for each left channel audio signal and each right channel audio signal of the stereo audio signal.

7. The method of claim 6, wherein the generating of the stereo audio signal comprises:

summing a filtering result of the N binaural filter related to a head related transfer function (HRTF) or a binaural room impulse response (BRIR) for binaural rendering.

8. A multichannel audio signal processing method processed by a decoder, comprising:

downmixing a M-channel audio signal of M channels for generating N-channel audio signal of N channels in a format converter using playback environment or virtual layout;

generating a stereo audio signal by performing binaural rendering the downmixed N-channel audio signal in a binaural renderer; and outputting the stereo audio signal, wherein a plurality of objects are inputted to an object renderer through a first dynamic range control (DRC1).

9. The method of claim 8, wherein a plurality of channel/prerendered objects and a plurality of objects are extracted from a bitstream.

10. The method of claim 9, wherein a plurality of channels corresponding to the M channel audio signal of M channels are inputted to the format converter through a first dynamic range control (DRC1).

11. The method of claim 8, wherein the N-channel audio signal of N channels are outputted from a mixer.

12. The method of claim 8, wherein the N-channel audio signal of N channels is inputted into the binaural renderer connected with a second dynamic range control (DRC2) or is inputted into a third dynamic range control (DRC3) connected with the second dynamic range control (DRC2) for a loudspeaker feed.

13. The method of claim 8, wherein the generating of the stereo audio signal comprises performing binaural rendering of the downmixed multichannel audio signal in a frequency domain.

14. The method of claim 8, wherein the generating of the stereo audio signal comprises generating the stereo audio signal using a plurality of binaural filters respectively corresponding to the N channels of the N-channel audio signal.

15. A multichannel audio signal processing apparatus processed by a Unified Speech Audio Coding (USAC) 3D decoder, comprising:

one or more processor configured to:

downmix a M-channel audio signal of M channels in a format converter for generating N-channel audio signal of N channels based on a three-dimensional (3D) loudspeaker layout;

generate a stereo audio signal by performing binaural rendering of the downmixed N-channel audio signal in a binaural renderer; and output the stereo audio signal, wherein a plurality of objects are inputted to an object renderer through a first dynamic range control (DRC1).

16. The apparatus of claim 15, wherein the USAC 3D decoder extracts a plurality of channel/prerendered objects and a plurality of objects from a bitstream.

17. The apparatus of claim 15, wherein a plurality of channels corresponding to the M channel audio signal of M channels are inputted to the format converter through a first dynamic range control (DRC1).

18. The apparatus of claim 15, wherein the N-channel audio signal of N channels are outputted from a mixer, wherein the N-channel audio signal of N channels is inputted into the binaural renderer connected with a second dynamic range control (DRC2) or is inputted into a third dynamic range control (DRC3) connected with the second dynamic range control (DRC2) for a loudspeaker feed.

* * * * *